United States Patent
Kise et al.

(10) Patent No.: US 9,863,710 B2
(45) Date of Patent: Jan. 9, 2018

(54) LAMINATED TOTAL HEAT EXCHANGE ELEMENT

(71) Applicant: Mitsubishi Electric Corporation, Chiyoda-ku (JP)

(72) Inventors: Koji Kise, Chiyoda-ku (JP); Masaru Shinozaki, Chiyoda-ku (JP); Masaru Takada, Chiyoda-ku (JP); Hajime Sotokawa, Chiyoda-ku (JP); Yuichi Ishimaru, Chiyoda-ku (JP); Hidemoto Arai, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 478 days.

(21) Appl. No.: 14/384,900

(22) PCT Filed: May 9, 2013

(86) PCT No.: PCT/JP2013/063057
§ 371 (c)(1),
(2) Date: Sep. 12, 2014

(87) PCT Pub. No.: WO2013/168772
PCT Pub. Date: Nov. 14, 2013

(65) Prior Publication Data
US 2015/0047817 A1    Feb. 19, 2015

(30) Foreign Application Priority Data

May 11, 2012 (JP) .................................. 2012-109854

(51) Int. Cl.
*F28D 9/00* (2006.01)
*F28F 3/08* (2006.01)
(Continued)

(52) U.S. Cl.
CPC ......... *F28D 9/0062* (2013.01); *F28D 9/0093* (2013.01); *F28D 21/0015* (2013.01);
(Continued)

(58) Field of Classification Search
CPC ...... F28F 3/086; F28D 9/0062; F28D 9/0093; F28D 21/0015; Y02B 30/563; F24F 12/006
(Continued)

(56) References Cited

U.S. PATENT DOCUMENTS 3,216,495 A * 11/1965 Johnson ................ F28D 9/0068
165/166
4,049,051 A * 9/1977 Parker ..................... F28F 13/14
165/146
(Continued)

FOREIGN PATENT DOCUMENTS

| CN | 102042772 A | 5/2011 |
| JP | 59-208339 A | 11/1984 |

(Continued)

OTHER PUBLICATIONS

Japanese Office Action dated Feb. 10, 2015 issued in corresponding Japanese Patent Appln. No. 2014-514748, with English translation (10 pages).
(Continued)

*Primary Examiner* — Tho V Duong
(74) *Attorney, Agent, or Firm* — Buchanan Ingersoll & Rooney PC

(57) ABSTRACT

A laminated total heat exchange element that includes a plurality of laminated plates, a first spacing member forming a first flow path between the laminated plates, and a second spacing member forming a second flow path between the laminated plates, wherein the first flow path is formed to allow fluid to pass from one side to another side of the (Continued)

laminated total heat exchange element, the second flow path is formed to allow fluid to pass from the another side to the one side of the laminated total heat exchange element, a third flow path, which communicates with the first flow path on the one side and extends substantially parallel to a lamination direction of the laminated plates, is formed, and a fourth flow path, which communicates with the second flow path on the another side and extends substantially parallel to the lamination direction of the laminated plate, is formed.

3 Claims, 13 Drawing Sheets

(51) Int. Cl.
*F28D 21/00* (2006.01)
*F24F 12/00* (2006.01)

(52) U.S. Cl.
CPC ............ *F28F 3/086* (2013.01); *F24F 12/006* (2013.01); *Y02B 30/563* (2013.01)

(58) Field of Classification Search
USPC ........................................ 165/166
See application file for complete search history.

(56) References Cited

U.S. PATENT DOCUMENTS

| | | | | | |
|---|---|---|---|---|---|
| 4,503,908 | A | * | 3/1985 | Rosman | F28D 9/0018 165/167 |
| 4,557,321 | A | * | 12/1985 | von Resch | F24F 12/001 165/122 |
| 6,959,492 | B1 | * | 11/2005 | Matsumoto | F28D 9/0075 165/135 |
| 7,125,540 | B1 | * | 10/2006 | Wegeng | B01J 19/0033 422/504 |
| 8,157,000 | B2 | * | 4/2012 | Johnston | F28D 9/005 165/167 |
| 9,417,016 | B2 | * | 8/2016 | Scott | F28D 9/005 |

| | | | |
|---|---|---|---|
| 2003/0094271 | A1 | 5/2003 | Leuthner |
| 2008/0149318 | A1* | 6/2008 | Dakhoul .................. F28F 3/086 165/167 |
| 2012/0073791 | A1 | 3/2012 | Dubois |

FOREIGN PATENT DOCUMENTS

| | | | |
|---|---|---|---|
| JP | 2-115672 | U | 9/1990 |
| JP | 4-313693 | A | 11/1992 |
| JP | 9-292193 | A | 11/1997 |
| JP | 10-002694 | A | 1/1998 |
| JP | 2001-304661 | A | 10/2001 |
| JP | 2003-336990 | A | 11/2003 |
| JP | 2004-504584 | A | 2/2004 |
| JP | 2004-278986 | A | 10/2004 |
| JP | 2005-134066 | A | 5/2005 |
| JP | 2007-271247 | A | 10/2007 |
| JP | 2008-002713 | A | 1/2008 |
| JP | 2008-070070 | A | 3/2008 |
| JP | 2008-089223 | A | 4/2008 |
| JP | 2010-223530 | A | 10/2010 |
| JP | 2011-257124 | A | 12/2011 |

OTHER PUBLICATIONS

Office Action (Notice of Rejection) dated Sep. 8, 2015, issued by the Japanese Patent Office in corresponding Japanese Patent Application No. 2014-514748, with an English Translation. (8 pages).
Office Action dated Dec. 3, 2015, by the State Intellectual Property Office of China in corresponding Chinese Patent Application No. 201380024089.9, and an English translation of the Office Action. (10 pages).
Extended European Search Report dated Dec. 23, 2015, by the European Patent Office in corresponding European Patent Application No. 13787485.5-1602. (5 pages).
International Search Report (PCT/ISA/210) dated Aug. 13, 2013, by the Japanese Patent Office as the International Searching Authority for International Application No. PCT/JP2013/063057.
Written Opinion (PCT/ISA/237) dated Aug. 13, 2013, by the Japanese Patent Office as the International Searching Authority for International Application No. PCT/JP2013/063057.

* cited by examiner

LAMINATED TOTAL HEAT EXCHANGE ELEMENT

FIELD

The present invention relates to a laminated total heat exchange element that performs total heat exchange between fluids by channeling a fluid, such as air, along each of a first flow path and a second flow path formed between laminated plates and a heat exchange ventilator that includes the laminated total heat exchange element.

BACKGROUND

Conventional laminated total heat exchange elements are typically provided with plates that separate two fluids from each other and a plurality of maintaining members that maintain the intervals between the plates. The plates have a moisture permeability and both sensible heat (temperature) and latent heat (humidity) are exchanged simultaneously through the plates, which act as an intermediary, without the two fluids being mixed (for example, see Patent Literature 1).

Moreover, there is a system that exchanges sensible heat and latent heat by applying, immersing, or adhering a dehumidifying material to the heat transfer plates that separate two fluids from each other and rotating the apparatus by 180 degrees at predetermined time intervals (for example, see Patent Literature 2).

CITATION LIST

Patent Literature

Patent Literature 1: Japanese Patent Application Laid-open No. 2008-70070
Patent Literature 2: Japanese Patent Application Laid-open No. 2007-271247

SUMMARY

Technical Problem

The laminated total heat exchange elements are often used for indoor ventilation; therefore, hereinafter, air ventilation is described as an example. In the laminated total heat exchange elements, it is desired to further increase the amount of total heat exchange.

In terms of the flow system for two fluids used for exchanging heat, there are crossflow, in which two fluids flow orthogonal to each other, and counterflow, in which two fluids flow in opposite directions to each other. With the configuration disclosed in Patent Literature 1 described above, the crossflow system is used. However, under conditions of equal pressure loss, the amount of heat exchange per unit volume is theoretically larger in a counterflow system. Therefore, with the crossflow system, a sufficient amount of heat exchange cannot be obtained in some cases.

With the configuration disclosed in Patent Literature 2 described above, although the counterflow system is used, the path connecting the inlet and the outlet of the first flow path intersects with the path connecting the inlet and the outlet of the second flow path; therefore, it is difficult to form a perfect counterflow. For example, if the width of the laminated total heat exchange element increases to about a few hundreds of millimeters, the flow system is almost like the crossflow system in most regions.

The present invention has been achieved in view of the above and an object of the present invention is to obtain a laminated total heat exchange element that easily maintains the region in which total heat exchange between two fluids is performed using a counterflow system, irrespective of the size or the like.

Solution to Problem

In order to solve the above problems and achieve the object, the present invention relates to a laminated total heat exchange element that includes a plurality of laminated plates that are laminated, a first spacing member that is inserted between the laminated plates and forms a first flow path between the laminated plates, and a second spacing member that is inserted between the laminated plates and forms a second flow path between the laminated plates, and in which a layer in which the first flow path is formed and a layer in which the second flow path is formed are alternately provided, wherein the first flow path is formed to allow fluid to pass from one side to another side of the laminated total heat exchange element, the second flow path is formed to allow fluid to pass from the another side to the one side of the laminated total heat exchange element, a third flow path is formed, the third flow path communicating with the first flow path on the one side and extending substantially parallel to a lamination direction of the laminated plates, and a fourth flow path is formed, the fourth flow path communicating with the second flow path on the another side and extending substantially parallel to the lamination direction of the laminated plate.

Advantageous Effects of Invention

According to the present invention, an effect is obtained where it becomes easy to maintain the region in which total heat exchange between two fluids is performed using a counterflow system, irrespective of the size or the like.

DESCRIPTION OF EMBODIMENTS

A laminated total heat exchange element and a heat exchange ventilator according to embodiments of the present invention will be explained below in detail with reference to the drawings. This invention is not limited to the embodiments.

First Embodiment

Figure 1:
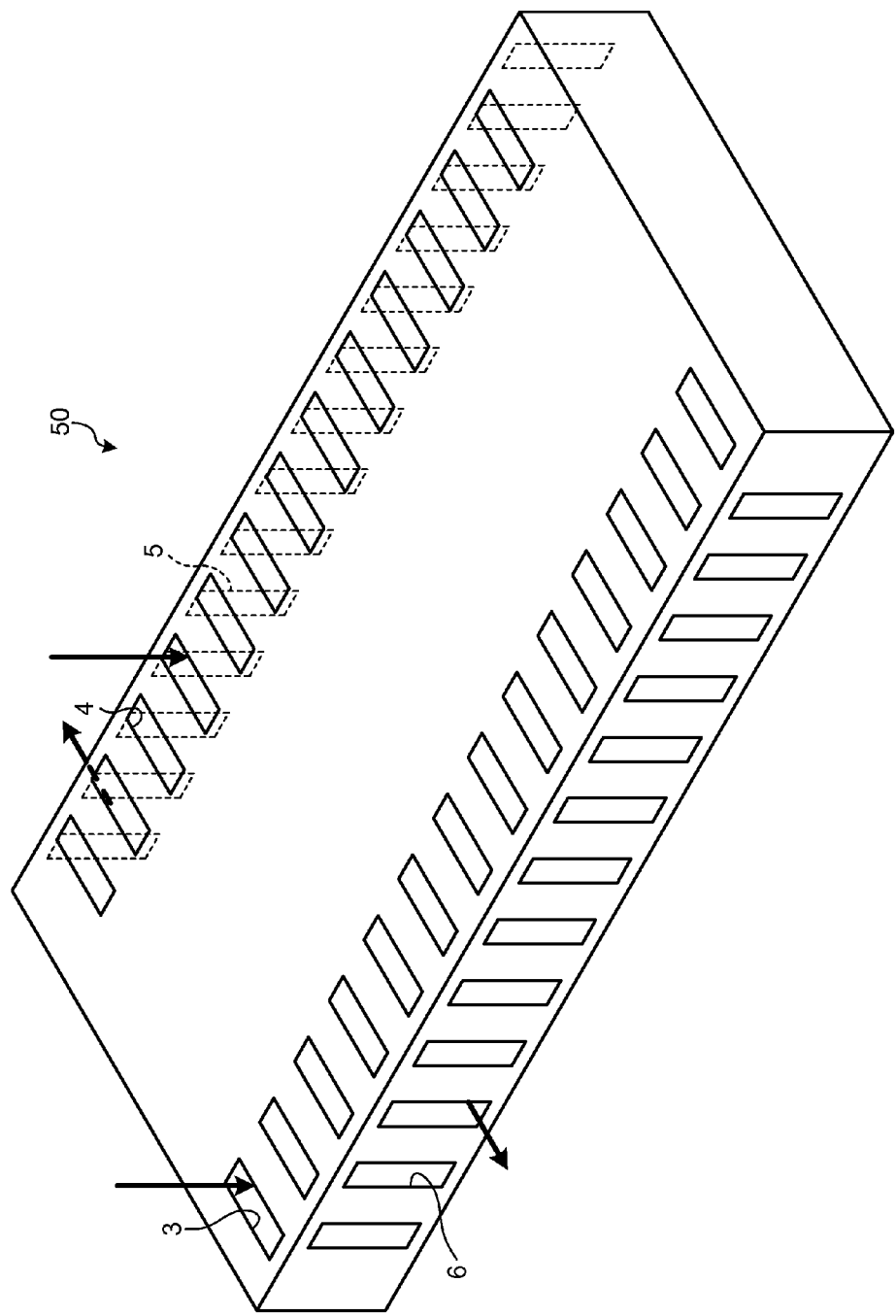
FIG. 1 is a perspective view illustrating the schematic configuration of a laminated total heat exchange element according to a first embodiment of the present invention.
Figure 2:
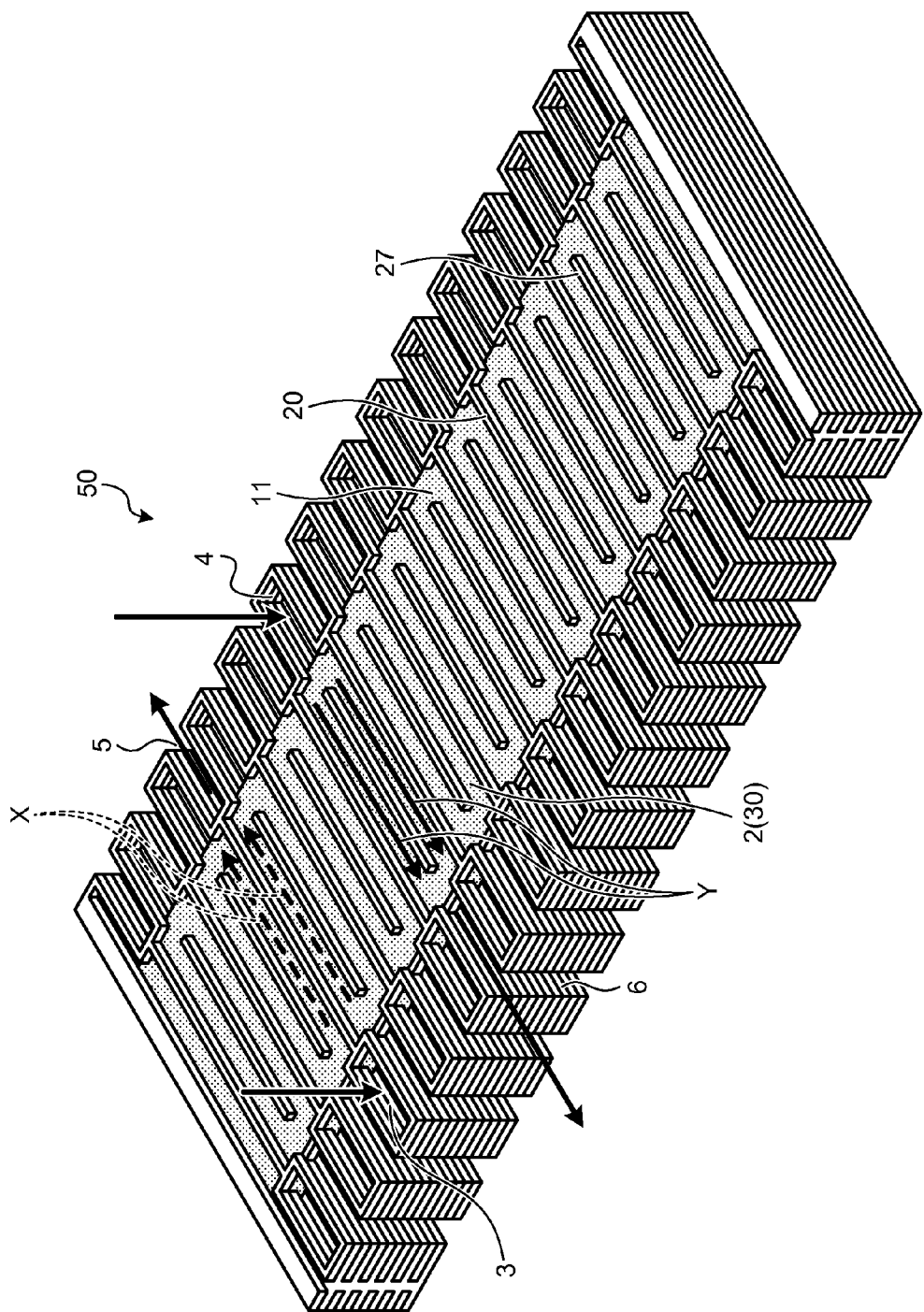
FIG. 2 is a diagram illustrating the schematic configuration of the laminated total heat exchange element cut away through the top plate.
Figure 3:
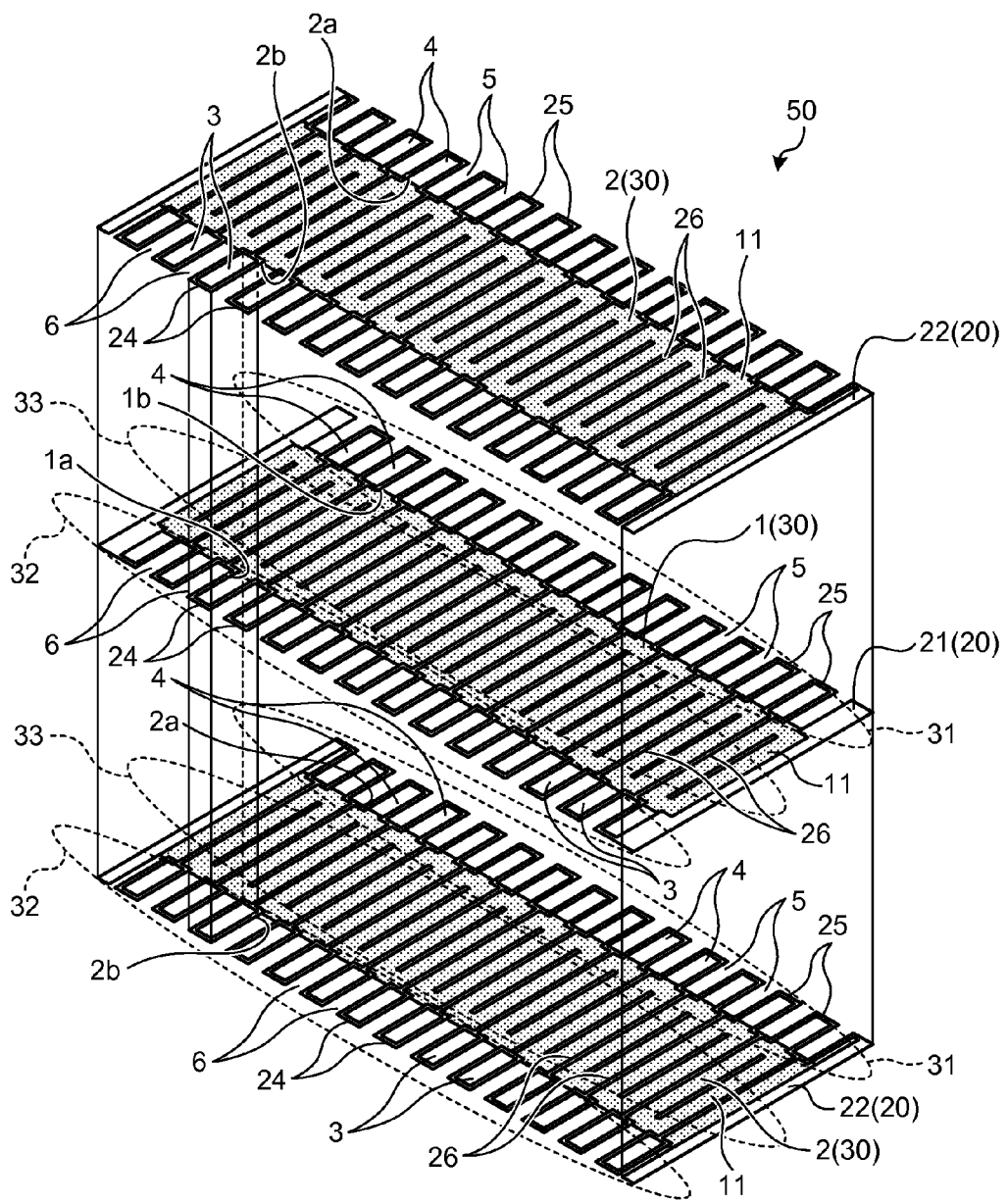
FIG. 3 is an exploded perspective view of the laminated total heat exchange element.

FIG. 1 is a perspective view illustrating the schematic configuration of a laminated total heat exchange element according to a first embodiment of the present invention. FIG. 2 is a diagram illustrating the schematic configuration of the laminated total heat exchange element cut away through the top plate. FIG. 3 is an exploded perspective view of a laminated total heat exchange element 50.

The laminated total heat exchange element 50 includes laminated plates 11 and spacing members 20. A plurality of the laminated plates 11 are provided and laminated. The spacing members 20 are inserted between the laminated plates 11 and thus flow paths 30, along which fluid can pass, are formed between the laminated plates 11.

The spacing members 20 are classified as a first spacing member 21 forming a first flow path 1 as the flow path 30 and a second spacing member 22 forming a second flow path 2 as the flow path 30. In the laminated total heat exchange element 50, a layer in which the first flow path 1 is formed by the insertion of the first spacing member 21 and a layer in which the second flow path 2 is formed by the insertion of the second spacing member 22 are alternately provided.

The first flow path 1 is formed to allow fluid to pass from one side to the other side of the laminated total heat exchange element 50 (in the direction indicated by arrow X). The first flow path 1 is divided into a plurality of flow paths by the first spacing member 21. An inlet 1a and an outlet 1b of fluid are formed for each of the divided flow paths. In other words, a plurality of the inlets 1a are formed on one side of the laminated total heat exchange element 50 and a plurality of the outlets 1b are formed on the other side of the laminated total heat exchange element 50. The first flow path 1 may be formed without being divided into a plurality of flow paths. In such a case, a plurality of the inlets 1a and a plurality of the outlets 1b are formed with respect to one flow path.

In the laminated total heat exchange element 50, a plurality of third flow paths 3, which are connected to the inlets 1a and along which fluid can pass, are formed. The third flow paths 3 are formed such that they extend substantially parallel to the lamination direction of the laminated plates 11. Moreover, a plurality of fifth flow paths 5, which are connected to the outlets 1b and along which fluid can pass, are formed. The fifth flow paths 5 are formed such that they extend substantially parallel to the direction (the direction indicated by arrow X) in which fluid passes in the first flow path 1.

The second flow path 2 is formed to allow fluid to pass from the other side to one side of the laminated total heat exchange element 50 (in the direction indicated by arrow Y). The second flow path 2 is divided into a plurality of flow paths by the second spacing member 22. An inlet 2a and an outlet 2b of fluid are formed for each of the divided flow paths. In other words, a plurality of the inlets 2a are formed on the other side of the laminated total heat exchange element 50 and a plurality of the outlets 2b are formed on one side of the laminated total heat exchange element 50. The second flow path 2 may be formed without being divided into a plurality of flow paths. In such a case, a plurality of the inlets 2a and a plurality of the outlets 2b are formed with respect to one flow path.

In the laminated total heat exchange element 50, a plurality of fourth flow paths 4, which are connected to the inlets 2a and along which fluid can pass, are formed. The fourth flow paths 4 are formed such that they extend substantially parallel to the lamination direction of the laminated plates 11. Moreover, a plurality of sixth flow paths 6, which are connected to the outlets 2b and along which fluid can pass, are formed. The sixth flow paths 6 are formed such that they extend substantially parallel to the direction (the direction indicated by arrow Y) in which fluid passes in the second flow path 2.

On one side of the laminated total heat exchange element 50 in a plan view, the third flow path 3 and the sixth flow path 6 are alternately arranged such that they do not overlap each other. Therefore, the third flow paths 3 and the sixth flow paths 6 can be connected to the inlets 1a and the outlet 2b, respectively, without interfering with other flow paths.

On the other side of the laminated total heat exchange element 50 in a plan view, the fourth flow path 4 and the fifth flow path 5 are alternately arranged such that they do not overlap each other. Therefore, the fourth flow paths 4 and the fifth flow paths 5 can be connected to the outlets 1b and the inlet 2a, respectively, without interfering with other flow paths.

The spacing members 20, which include the first spacing members 21 and the second spacing members 22, each include a region 33 that covers the laminated plate 11 in a plan view, a region 32 that protrudes from the laminated plate 11 to one side of the laminated total heat exchange element 50, and a region 31 that protrudes from the laminated plate 11 to the other side of the laminated total heat exchange element 50. The first flow path 1 described above is formed by the region 33 of the first spacing member 21 covering the laminated plate 11. The second flow path 2 is formed by the region 33 of the second spacing member 22 covering the laminated plate 11.

The third flow paths 3 and the sixth flow paths 6 are formed by the regions 32 of the first spacing member 21 and the second spacing member 22. The region 32 protrudes to the other side of the laminated total heat exchange element 50. More specifically, a wall surface portion 24, which forms the wall surfaces of the third flow paths 3 and the sixth flow paths 6, is provided in the region 32. The wall surface portions 24 are laminated and brought into close contact with each other, thereby forming the wall surfaces of the third flow paths 3 and the sixth flow paths 6. As described above, because the third flow path 3 and the sixth flow path 6 are alternately arranged, the third flow paths 3 and the sixth flow paths 6 can share the wall surfaces forming the flow paths.

The wall surface portion 24 provided in the first spacing member 21 is such that the portions that form the third flow paths 3 are open to communicate with the first flow path 1 and the portions that form the sixth flow paths 6 are open to one side of the laminated total heat exchange element 50.

The wall surface portion 24 provided in the second spacing member 22 is such that the portions that form the third flow paths 3 have a frame shape in a plan view and the portions that form the sixth flow paths 6 are open to the second flow path 2 side and one side of the laminated total heat exchange element 50.

The fourth flow paths 4 and the fifth flow paths 5 are formed by the regions 31 of the first spacing member 21 and the second spacing member 22. The region 31 protrudes to the other side of the laminated total heat exchange element 50. More specifically, a wall surface portion 25, which forms the wall surfaces of the fourth flow paths 4 and the fifth flow paths 5, is provided in the region 31. The wall surface portions 25 are laminated and brought into close contact with each other, thereby forming the wall surfaces of the fourth flow paths 4 and the fifth flow paths 5. As described above, because the fourth flow path 4 and the fifth flow path 5 are alternately arranged, the fourth flow paths 4 and the fifth flow paths 5 can share the wall surfaces forming the flow paths.

The wall surface portion 25 provided in the first spacing member 21 is such that the portions that form the fourth flow paths 4 have a frame shape in a plan view and the portions that form the fifth flow paths 5 are open to the first flow path 1 side and the other side of the laminated total heat exchange element 50.

The wall surface portion 25 provided in the second spacing member 22 is such that the portions that form the fourth flow paths 4 are open to communicate with the second flow path 2 and the portions that form the fifth flow paths 5 are open to the other side of the laminated total heat exchange element 50.

As described above, the shapes of the wall surface portions 24 and 25 forming the third to sixth flow paths 3 to 6 are made different from each other in the first spacing members 21 and the second spacing members 22, thereby causing each of the third to sixth flow paths 3 to 6 to communicate with a desired flow path (any one of the first flow path 1 and the second flow path 2). For example, in a case of the third flow paths 3 as an example, the wall surface portion 24 formed in the first spacing member 21 is open to the first flow path 1 side; therefore, fluid can flow into the first flow path 1. However, because the wall surface portion 25 formed in the second spacing member 22 is closed on the second flow path 2 side, fluid does not flow into the second flow path 2.

The region 31, the region 32, and the region 33 are integrally formed. The wall surface portions 24 and 25 have approximately the same height as that of the first flow path 1 and the second flow path 2. In addition to the first flow path 1 and the second flow path 2, the third to sixth flow paths 3 to 6 are also formed simply by laminating the laminated plates 11 and the spacing members 20; therefore, the manufacturing cost can be reduced.

With the laminated total heat exchange element 50 configured in such a manner, fluid (hereinafter, also referred to as a first fluid), such as air, which has flowed in from the third flow paths 3 passes along the first flow path 1 and flows out via the fifth flow paths 5. Fluid (hereinafter, also referred to as a second fluid), such as air, which has flowed in from the fourth flow paths 4 passes along the second flow path 2 and flows out via the sixth flow paths 6. The wall surface portions 24 and 25 may be formed on the laminated plates 11.

As described above, with the laminated total heat exchange element 50 according to the present embodiment, what is called a counterflow laminated total heat exchange element 50 is formed in which the direction (the direction indicated by arrow X) in which fluid passes in the first flow path 1 and the direction (the direction indicated by arrow Y) in which fluid passes in the second flow path 2 are opposed to each other. Therefore, it is easy to improve the heat exchange efficiency compared with a crossflow heat exchange element.

A plurality of the inlets 1a with respect to the first flow path 1 are formed over substantially the entire region in its width direction on one side of the laminated total heat exchange element 50. A plurality of the outlets 1b with respect to the first flow path 1 are formed over substantially the entire region in its width direction on the other side of the laminated total heat exchange element 50. Therefore, if the first fluid that has flowed in the first flow path 1 from the inlets 1a is caused to flow substantially parallel to the arrow X, the first fluid can be caused to flow out via the outlets 1b.

A plurality of the inlets 2a with respect to the second flow path 2 are formed over substantially the entire region in its width direction on the other side of the laminated total heat exchange element 50. A plurality of the outlets 2b with respect to the second flow path 2 are formed over substantially the entire region in its width direction on one side of the laminated total heat exchange element 50. Therefore, if the second fluid that has flowed in the second flow path 2 from the inlets 2a is caused to flow substantially parallel to the arrow Y, the second fluid can be caused to flow out via the outlets 2b.

In other words, because most of the first fluid and the second fluid does not flow in directions that are not parallel to the arrows X and Y, total heat exchange using the counterflow system can be realized in most of the regions in the first flow path 1 and the second flow path 2. The same is true for the case where the width of the laminated total heat exchange element 50 is increased. Therefore, total heat exchange using the counterflow system can be realized irrespective of the size of the laminated total heat exchange element 50 and thus the heat exchange efficiency can be improved.

The laminated plates 11 are formed by applying hygroscopic chemicals to plates made of paper. Accordingly, it is possible to exchange sensible heat and latent heat between the first fluid passing along the first flow path 1 and the second fluid passing along the second flow path 2 through the laminated plates 11.

The laminated total heat exchange element 50 is configured by laminating the laminated plates 11 that are formed relatively thin and the spacing members 20; therefore, it is difficult in some cases to obtain sufficient strength. In contrast, in the present embodiment, the wall surfaces extending in the lamination direction are formed on one side and the other side of the laminated total heat exchange element 50 by laminating the wall surface portions 24 and 25; therefore, the strength of the laminated total heat exchange element 50 can be improved.

The laminated total heat exchange element 50 may be manufactured by preparing the laminated plates 11 and the spacing members 20 separately and sequentially laminating them. Alternatively, the laminated plates 11 and the spacing members 20 may be manufactured simultaneously by insert molding such that the laminated plates 11 are inserted between the upper and lower spacing members 20 in advance. By performing insert molding, even when the spacing members 20 are provided with wall surfaces such as independent walls 27, which are not connected to peripheral components, the independent walls 27 can be held by the laminated plates 11. In other words, it is possible to allow greater design freedom of the wall surfaces forming the flow paths 30.

Moreover, in the present embodiment, the laminated total heat exchange element is described in which chemicals are applied to the laminated plates 11 to facilitate latent heat exchange. However, it may be applicable to use a laminated total heat exchange element in which the laminated plates that do not have chemicals applied to them are used or to use a laminated total heat exchange element in which the laminated plates (such as thin resin plates) that do not exchange latent heat are used.

Heat is also exchanged between the first fluid and the second fluid flowing along the third flow paths 3 and the sixth flow paths 6 and between the first fluid and the second fluid flowing along the fourth flow paths 4 and the fifth flow paths 5 through the wall surface portions 24 and 25 even though the crossflow system is used; therefore, the heat exchange efficiency can be further improved.

The exchange efficiency with respect to the same pressure loss is low in crossflow compared with counterflow; therefore, it is desirable to perform total heat exchange in the counterflow portions, i.e., the first flow path 1 and the second flow path 2, as much as possible and to minimize the pressure loss in the crossflow portions.

Therefore, in the present embodiment, the structure is such that the pressure loss in the region in which heat is exchanged by using crossflow is suppressed to a low level by making the equivalent diameters of the third flow paths 3 and the fourth flow paths 4 larger than those of the first flow path 1 and the second flow path 2. In the case of a rectangular flow path, the equivalent diameter is given by the following equation:

$$\text{Equivalent diameter} = 4 \times A \times B / (2 \times A + 2 \times B)$$

where A is a short side and B is a long side.

Normally, the flow-path heights of the first flow path 1 and the second flow path 2 are approximately a few millimeters, more specifically, in the range of approximately 0.7 millimeters to 4 millimeters. The interval at which the spacing members 20 are arranged (the widths of the first flow path 1 and the second flow path 2) is approximately a few millimeters to ten and several millimeters. The size of one side of the third flow paths 3 and the fourth flow paths 4 is approximately the interval at which the spacing members 20 are arranged and the size of the other side thereof is approximately ten and several millimeters to a few hundreds of millimeters.

In the present embodiment, the configuration is such that fluid passes from the top surface side to the bottom surface side along both the third flow paths 3 and the fourth flow paths 4; however, the configuration is not limited to this. The configuration may be such that fluid passes from the bottom surface side to the top surface side along one of the third flow paths 3 and the fourth flow paths 4. The configuration may also be such that the third flow paths 3 and the fourth flow paths 4 penetrate between the top surface and the bottom surface.

Figure 4:
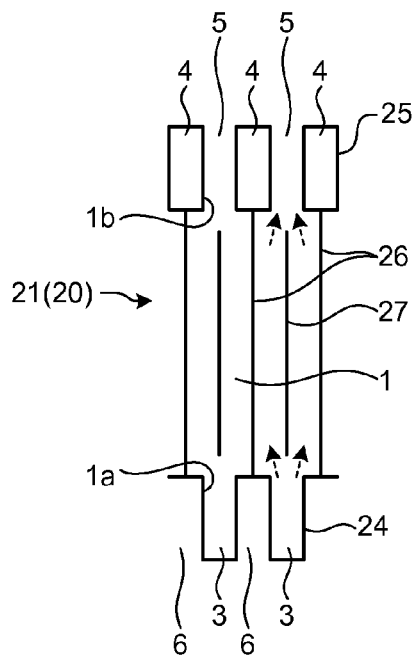
FIG. 4 is a partial plan view schematically illustrating the configuration of a first spacing member.

FIG. 4 is a partial plan view schematically illustrating the configuration of the first spacing member 21. As illustrated in FIG. 4, in the first flow path 1, partition walls 26 are provided in the first spacing member 21 so that the inlets 1*a* and the outlets 1*b* are connected on a one-to-one basis. With such a configuration, the configuration of the partition walls 26 can be simplified and thus the design can be simplified.

Figure 5:
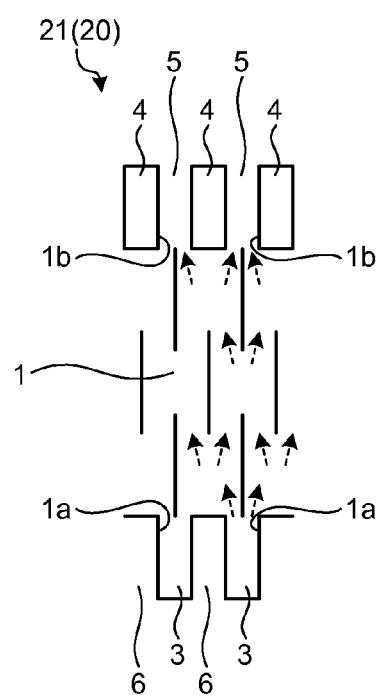
FIG. 5 is a partial plan view schematically illustrating the configuration of the first spacing member as another example.

FIG. 5 is a partial plan view schematically illustrating the configuration of the first spacing member 21 as another example. As illustrated in FIG. 5, the configuration may be such that a plurality of the inlets 1*a* and a plurality of the inlets 1*b* are connected in the first flow path 1 by dividing the partition walls 26. With such a configuration, when there is a bias in the flow rate distribution between a plurality of the formed third flow paths 3, reduction in the heat exchange efficiency due to the drift can be suppressed.

Figure 6:
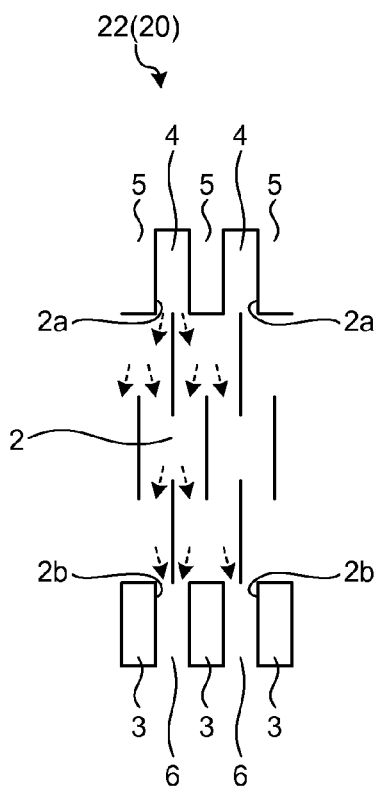
FIG. 6 is a diagram illustrating an example where the first spacing member illustrated in FIG. 5 is rotated by 180 degrees to be used as a second spacing member.
Figure 7:
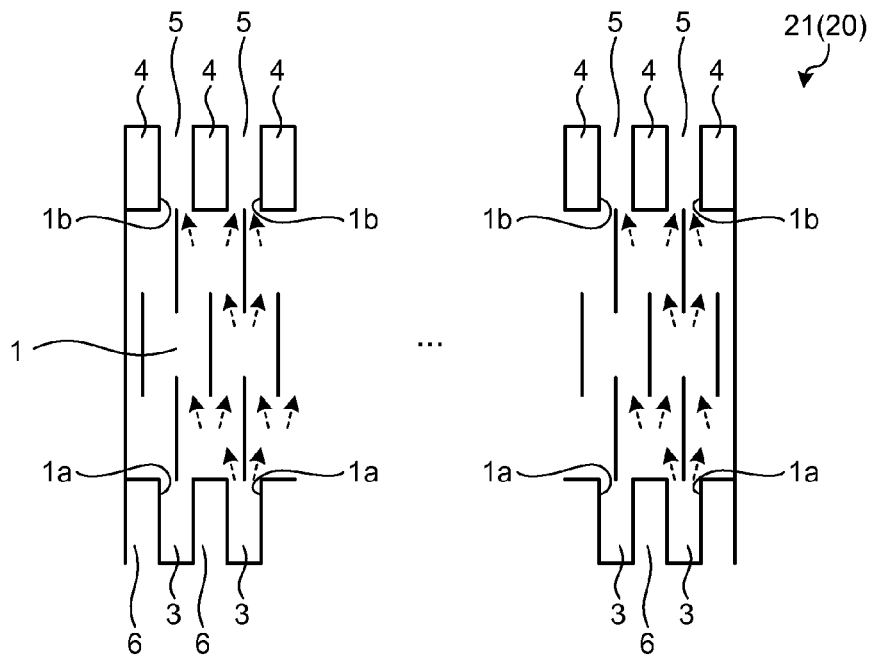
FIG. 7 is a diagram illustrating an example where the spacing members manufactured in the same shape are used as the first spacing members.
Figure 8:
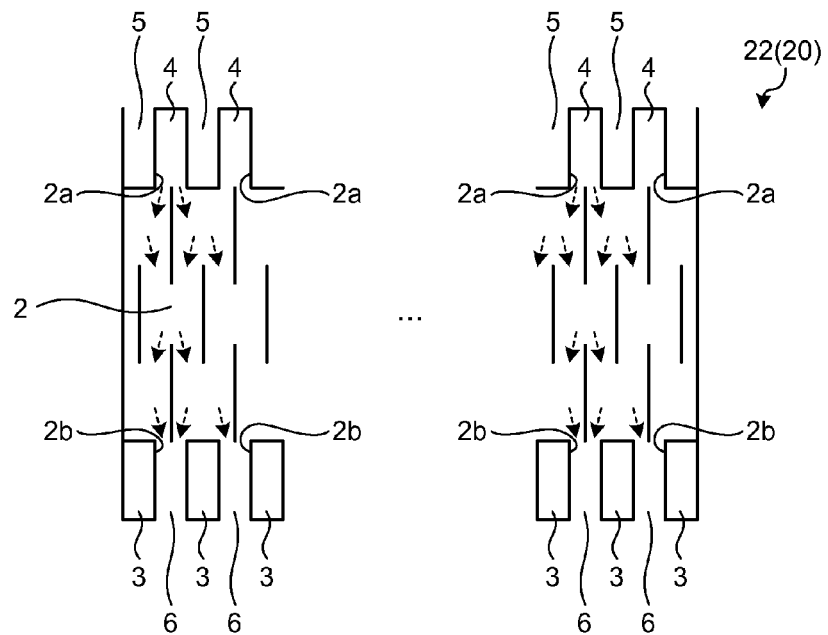
FIG. 8 is a diagram illustrating an example where the spacing members manufactured in the same shape are used as the second spacing members.

FIG. 6 is a diagram illustrating an example where the first spacing member 21 illustrated in FIG. 5 is rotated by 180 degrees to be used as the second spacing member 22. In this manner, by using the first spacing member 21 and the second spacing member 22 that both have the same shape, the design can be simplified and thus the manufacturing cost can be reduced compared with the case where the first spacing member 21 and the second spacing member 22 are separately manufactured. FIG. 7 is a diagram illustrating an example where the spacing members 20 manufactured in the same shape are used as the first spacing members 21 and FIG. 8 is a diagram illustrating an example where the spacing members 20 manufactured in the same shape are used as the second spacing members 22. For example, productivity can be improved by reducing the number of types of mold for manufacturing the spacing members.

At least one of the first spacing member 21 and the second spacing member 22 may be configured by laminating a plurality of spacing members. In addition to the first spacing member 21, one or a plurality of types of other spacing members may be laminated.

The direction in which fluid flows in the laminated total heat exchange element 50 may be in a direction opposite to that explained above. In other words, the first flow path 1 may cause fluid to flow in from the fifth flow paths 5 and flow out via the third flow paths 3, and the second flow path 2 may cause fluid to flow in from the sixth flow paths 6 and flow out via the fourth flow paths 4.

Second Embodiment

Figure 9:
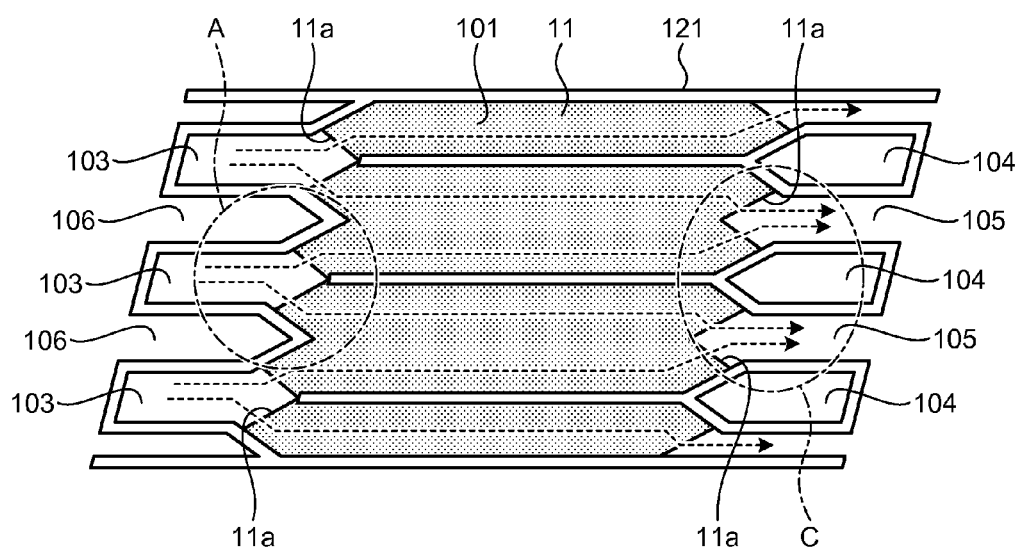
FIG. 9 is a perspective view illustrating a layer in which a first flow path is formed by a first spacing member in a total heat exchange element according to a second embodiment of the present invention.
Figure 10:
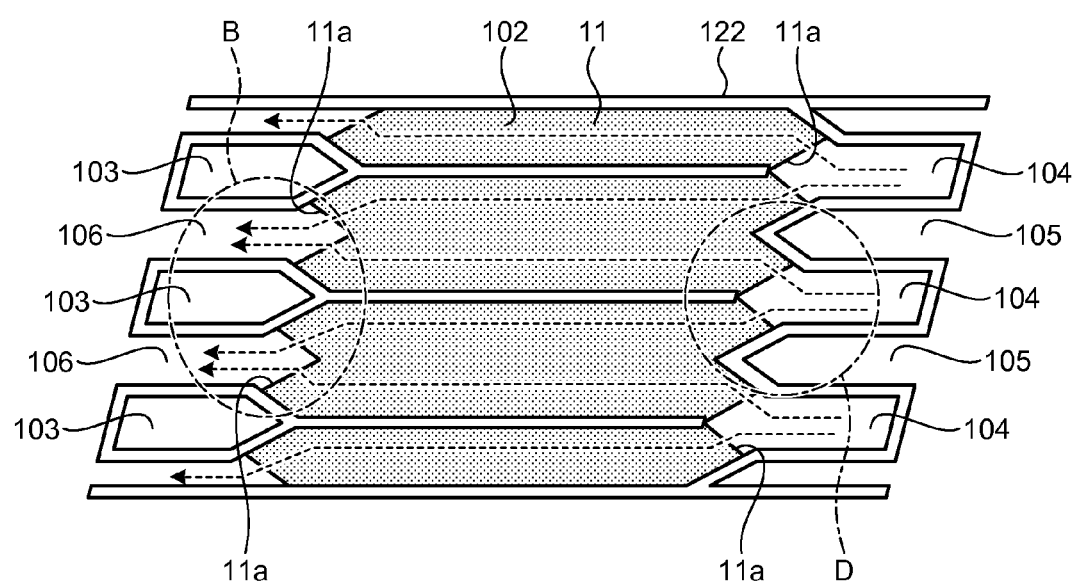
FIG. 10 is a perspective view illustrating a layer in which a second flow path is formed by a second spacing member in the total heat exchange element according to the second embodiment of the present invention.

FIG. 9 is a perspective view illustrating a layer in which a first flow path 101 is formed by a first spacing member 121 in a total heat exchange element according to a second embodiment of the present invention, and FIG. 10 is a perspective view illustrating a layer in which a second flow path 102 is formed by a second spacing member 122 in the total heat exchange element according to the second embodiment of the present invention. The same configurations as those of the above embodiment are denoted by the same reference numerals and detailed explanation thereof is omitted.

Figure 11:
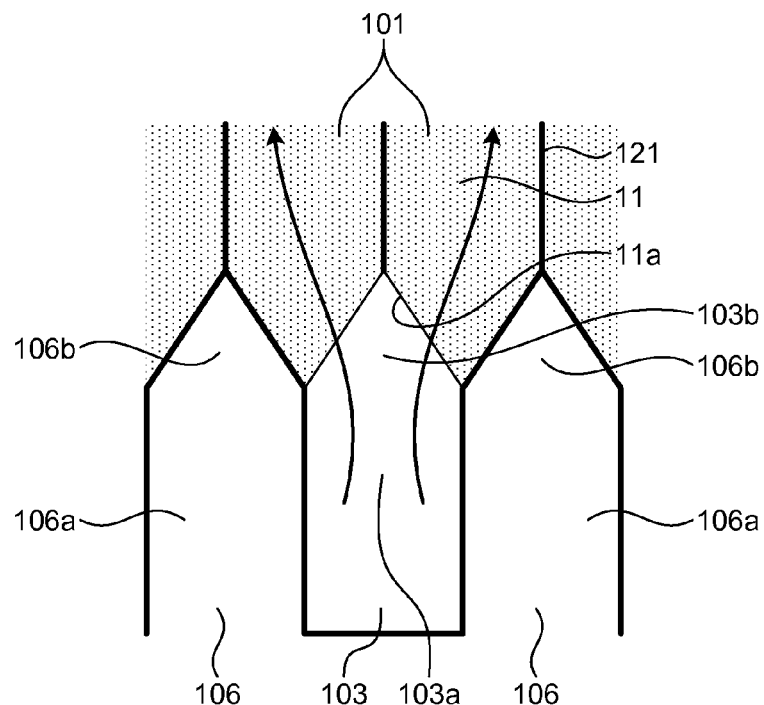
FIG. 11 is an expanded partial plan view of portion A illustrated in FIG. 9.
Figure 12:
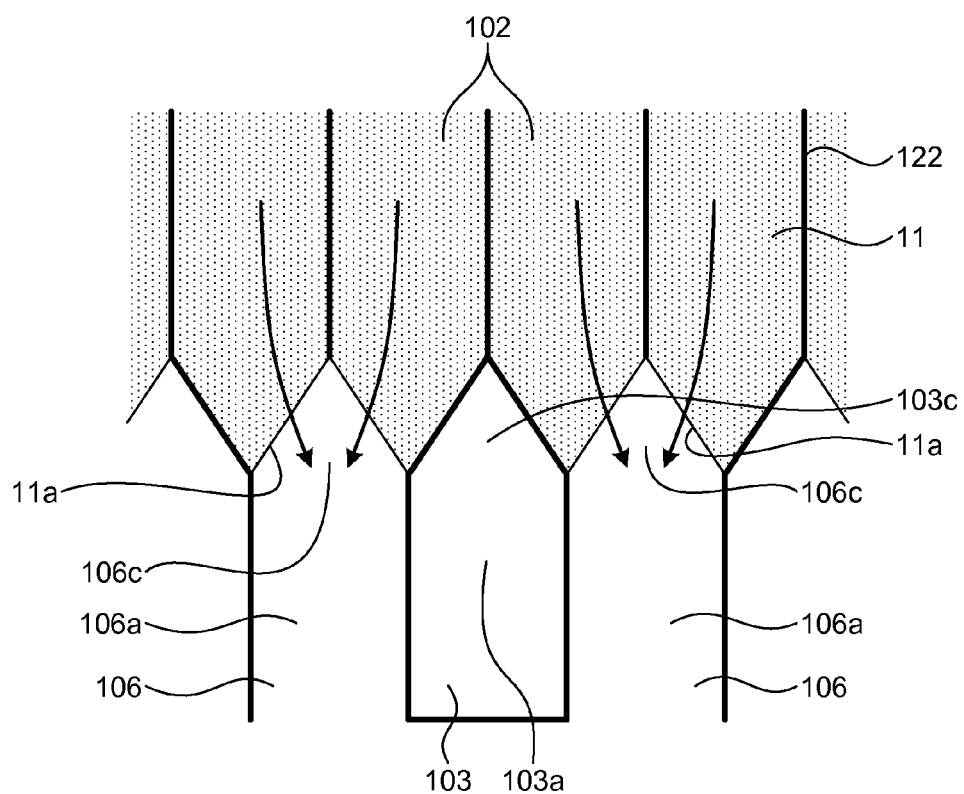
FIG. 12 is an expanded partial plan view of portion B illustrated in FIG. 10.

First, third flow paths 103 and sixth flow paths 106 are explained. FIG. 11 is an expanded partial plan view of portion A illustrated in FIG. 9. FIG. 12 is an expanded partial plan view of portion B illustrated in FIG. 10.

In the second embodiment, as illustrated in FIG. 9 and FIG. 11, in the layer in which the first flow path 101 is formed, the third flow paths 103 each include a rectangular portion 103a having a rectangular shape when viewed from the lamination direction of the laminated plates 11 and an incremental portion 103b, in which the width of the flow path gradually increases toward the first flow path 101.

Because the width of the flow path gradually increases toward the first flow path 101 from the third flow path 103, it is possible to suppress the occurrence of stagnation (eddies) in the portion where the flow paths are connected compared with the case where the width of the flow path changes rapidly. In the stagnation occurrence portion, fluid easily accumulates and therefore the heat transfer performance is easily reduced. In the second embodiment, reduction in the heat transfer efficiency can be suppressed by suppressing the occurrence of stagnation.

In the layer in which the first flow path 101 is formed, the sixth flow paths 106 each include a rectangular portion 106a having a rectangular shape when viewed from the lamination direction of the laminated plates 11 and a tapered portion 106b, in which the width of the flow path gradually decreases toward the first flow path 101. The third flow path 103 and the sixth flow path 106 are formed to be adjacent to each other; therefore, the partition wall that gradually increases the width of the flow path in the incremental portion 103b gradually reduces the width of the flow path in the tapered portion 106b.

As illustrated in FIG. 10 and FIG. 12, in the layer in which the second flow path 102 is formed, the third flow paths 103 each include the rectangular portion 103a having a rectangular shape when viewed from the lamination direction of the laminated plates 11 and a tapered portion 103c, in which the width of the flow path gradually decreases toward the second flow path 102.

In the layer in which the second flow path 102 is formed, the sixth flow paths 106 each include the rectangular portion 106a having a rectangular shape when viewed from the lamination direction of the laminated plates 11 and an incremental portion 106c, in which the width of the flow path gradually increases toward the second flow path 102. Fluid flows into the sixth flow paths 106 from the second flow path 102. With the provision of the incremental portion 106c, it is possible to suppress a rapid change in the flow path area in the portion where the second flow path 102 and the sixth flow path 106 are connected. Accordingly, the pressure loss can be reduced and the flow of the fluid can be smoothed.

The third flow path 103 and the sixth flow path 106 are formed to be adjacent to each other; therefore, the partition wall that gradually increases the width of the flow path in the incremental portion 106c gradually reduces the width of the flow path in the tapered portion 103c.

As illustrated in FIG. 12, the third flow paths 103 each form a pentagonal shape with the rectangular portion 103a and the tapered portion 103c. Cutouts 11a are formed in the regions of the laminated plate 11 where the laminated plate 11 overlaps the tapered portions 103c when viewed from the lamination direction; therefore, the third flow paths 103 can be formed as pentagonal flow paths over the entire total heat exchange element. Accordingly, it is possible to increase the area of the flow paths compared with that of the flow paths formed only with the rectangular portions 103a; therefore, the pressure loss in the portions of the third flow paths 103 can be reduced.

In a similar manner, as illustrated in FIG. 11, the sixth flow paths 106 each form a pentagonal shape with the rectangular portion 106a and the tapered portion 106b. The cutouts 11a are formed in the regions of the laminated plate 11 where the laminated plate 11 overlaps the tapered portions 106b when viewed from the lamination direction; therefore, the sixth flow paths 106 can be formed as pentagonal flow paths over the entire total heat exchange element. Accordingly, it is possible to increase the area of the flow paths compared with that of the flow paths formed only with the rectangular portions 106a; therefore, the pressure loss in the portions of the sixth flow paths 106 can be reduced.

The shape of the third flow paths 103 and the sixth flow paths 106 is not limited to the pentagonal shape and may be another shape, such as a polygonal shape with six sides or more, as long as the width of the flow paths gradually decreases toward the first flow path 101 or the second flow path 102.

Figure 13:
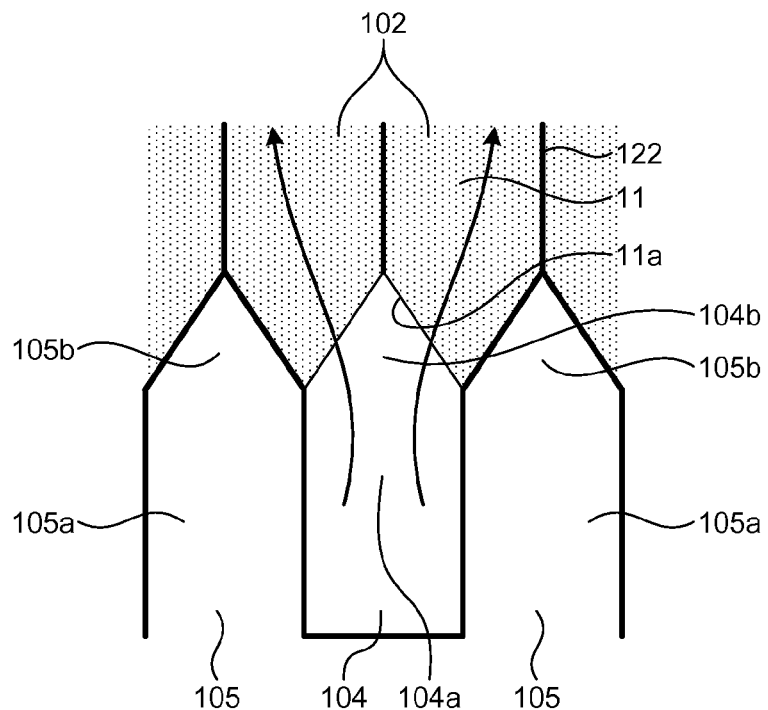
FIG. 13 is an expanded partial plan view of portion D illustrated in FIG. 10.
Figure 14:
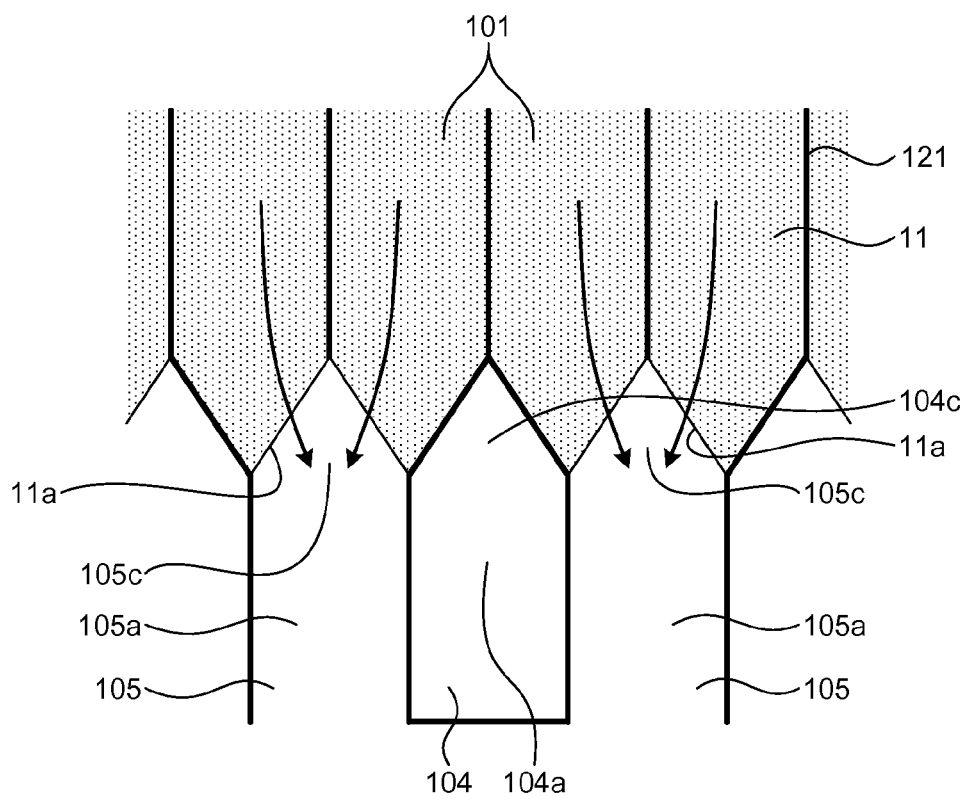
FIG. 14 is an expanded partial plan view of portion C illustrated in FIG. 9.

Next, fourth flow paths 104 and fifth flow paths 105 are explained. FIG. 13 is an expanded partial plan view of portion D illustrated in FIG. 10. FIG. 14 is an expanded partial plan view of portion C illustrated in FIG. 9.

As illustrated in FIG. 10 and FIG. 13, in the layer in which the second flow path 102 is formed, the fourth flow paths 104 each include a rectangular portion 104a having a rectangular shape when viewed from the lamination direction of the laminated plates 11 and an incremental portion 104b, in which the width of the flow path gradually increases toward the second flow path 102.

Because the width of the flow path gradually increases toward the second flow path 102 from the fourth flow path 104, it is possible to suppress the occurrence of stagnation (eddies) in the portion where the flow paths are connected compared with the case where the width of the flow path changes rapidly. In the stagnation occurrence portion, fluid easily accumulates and therefore the heat transfer performance is easily reduced. In the second embodiment, reduction in the heat transfer efficiency can be suppressed by suppressing the occurrence of stagnation.

In the layer in which the second flow path 102 is formed, the fifth flow paths 105 each include a rectangular portion 105a having a rectangular shape when viewed from the lamination direction of the laminated plates 11 and a tapered portion 105b, in which the width of the flow path gradually decreases toward the second flow path 102. The fourth flow path 104 and the fifth flow path 105 are formed to be adjacent to each other; therefore, the partition wall that gradually increases the width of the flow path in the incremental portion 104b gradually reduces the width of the flow path in the tapered portion 105b.

As illustrated in FIG. 9 and FIG. 14, in the layer in which the first flow path 101 is formed, the fourth flow paths 104 each include the rectangular portion 104a having a rectangular shape when viewed from the lamination direction of the laminated plates 11 and a tapered portion 104c, in which the width of the flow path gradually decreases toward the first flow path 101.

In the layer in which the first flow path 101 is formed, the fifth flow paths 105 each include the rectangular portion 105a having a rectangular shape when viewed from the lamination direction of the laminated plates 11 and an incremental portion 105c, in which the width of the flow path gradually increases toward the first flow path 101. Fluid flows into the fifth flow paths 105 from the first flow path 101. With the provision of the incremental portion 105c, it is possible to suppress a rapid change in the flow path area in the portion where the first flow path 101 and the fifth flow path 105 are connected. Accordingly, the pressure loss can be reduced and the flow of the fluid can be smoothed.

The fourth flow path 104 and the fifth flow path 105 are formed to be adjacent to each other; therefore, the partition wall that gradually increases the width of the flow path in the incremental portion 105c gradually reduces the width of the flow path in the tapered portion 104c.

As illustrated in FIG. 14, the fourth flow paths 104 each form a pentagonal shape with the rectangular portion 104a and the tapered portion 104c. The cutouts 11a are formed in the regions of the laminated plate 11 where the laminated plate 11 overlaps the tapered portions 104c when viewed from the lamination direction; therefore, the fourth flow paths 104 can be formed as pentagonal flow paths over the entire total heat exchange element. Accordingly, it is possible to increase the area of the flow paths compared with that of the flow paths formed only with the rectangular portions 104a; therefore, the pressure loss in the portions of the fourth flow paths 104 can be reduced.

In a similar manner, as illustrated in FIG. 13, the fifth flow paths 105 each form a pentagonal shape with the rectangular portion 105a and the tapered portion 105b. The cutouts 11a are formed in the regions of the laminated plate 11 where the laminated plate 11 overlaps the tapered portions 105b when viewed from the lamination direction; therefore, the fifth flow paths 105 can be formed as pentagonal flow paths over the entire total heat exchange element. Accordingly, it is possible to increase the area of the flow paths compared with that of the flow paths formed only with the rectangular portions 105a; therefore, the pressure loss in the portions of the fifth flow paths 105 can be reduced.

The shape of the fourth flow paths 104 and the fifth flow paths 105 is not limited to the pentagonal shape and may be another shape, such as a polygonal shape with six sides or more, as long as the width of the flow paths gradually decreases toward the first flow path 101 or the second flow path 102.

In the present embodiment, the first spacing member 121 illustrated in FIG. 9 and the second spacing member 122 illustrated in FIG. 10 have the same shape; therefore, the spacing member can be used both as the first spacing member 121 and as the second spacing member 122 by rotating it by 180 degrees on the same plane as the laminated plate 11. When the first spacing member 121 and the second spacing member 122 have the same shape, the design can be simplified and the manufacturing cost can be reduced compared with the case where the first spacing member 121 and the second spacing member 122 are separately manufactured. For example, productivity can be improved by reducing the number of types of mold for manufacturing the spacing members.

As illustrated in the first embodiment, in the case of a rectangular flow path, the equivalent diameter is given by 4×A×B/(2×A+2×B), where "A×B" is the flow path area and "2×A+2×B" is the perimeter. Accordingly, as in the second embodiment, when the flow paths 103 to 106 each have a polygonal shape with five sides or more, their equivalent diameters are given by 4×flow path area/perimeter.

Third Embodiment

Figure 15:
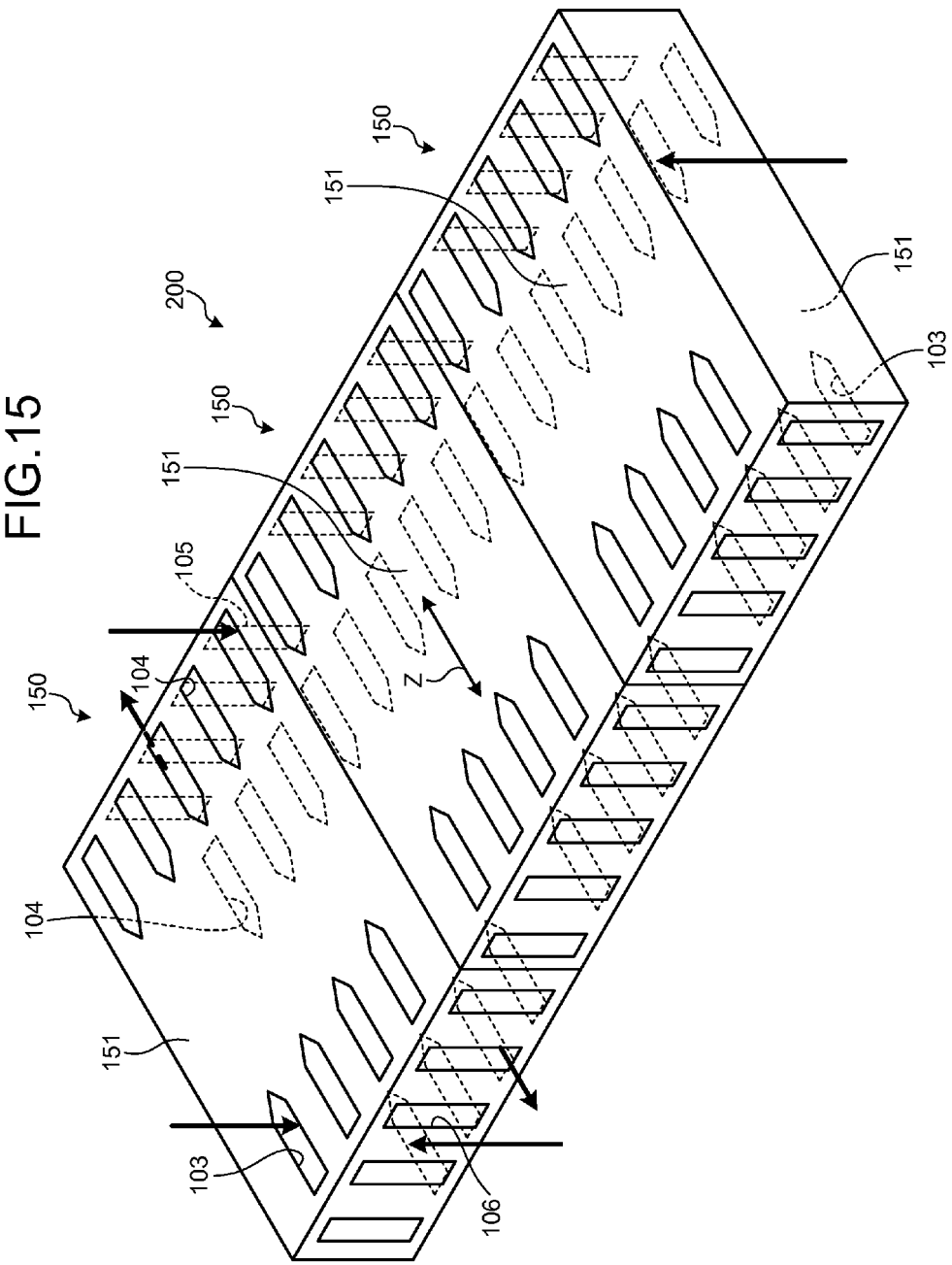
FIG. 15 is a perspective view of the outside of a laminated total heat exchange element according to a third embodiment of the present invention.

FIG. 15 is a perspective view of the outside of a laminated total heat exchange element 200 according to a third embodiment of the present invention. The same configurations as those of the above embodiments are denoted by the same reference numerals and detailed explanation thereof is omitted. In the third embodiment, the laminated plates 11, the first spacing members 121, and the second spacing members 122 are laminated (see also FIGS. 9 and 10, and the like), the laminate is sandwiched by outer plates 151 forming the outer surface to obtain an element unit 150, and a plurality of the element units 150 are arranged to form the laminated total heat exchange element 200.

The element units 150 are arranged in a direction substantially perpendicular to the lamination direction of the laminated plates 11 and the direction (the direction indicated by arrow Z) in which fluid passes in the first flow path 101. By arranging a plurality of the element units 150, the area of the third flow paths 103 and the fourth flow paths 104 can be increased. The wind speed of the fluid flowing along the third flow paths 103 and the fourth flow paths 104 can be reduced by increasing the area of the flow paths.

Accordingly, it is possible to reduce the pressure loss that is caused by the compression of the fluid when flowing into the third flow paths 103 and the fourth flow paths 104. Moreover, the larger the volume of air flow required by the entire ventilator, the larger the number of the element units 150 that are arranged. Therefore, the length of the laminated total heat exchange element 200 in a direction in which the element units 150 are arranged becomes larger than the lamination height of the element units 150.

In order to reduce the pressure loss that is caused by the compression of the fluid, it is preferable to increase the number of the element units 150 that are arranged and reduce the lamination height. The constraints thereof are defined by the required size of the products.

Figure 16:
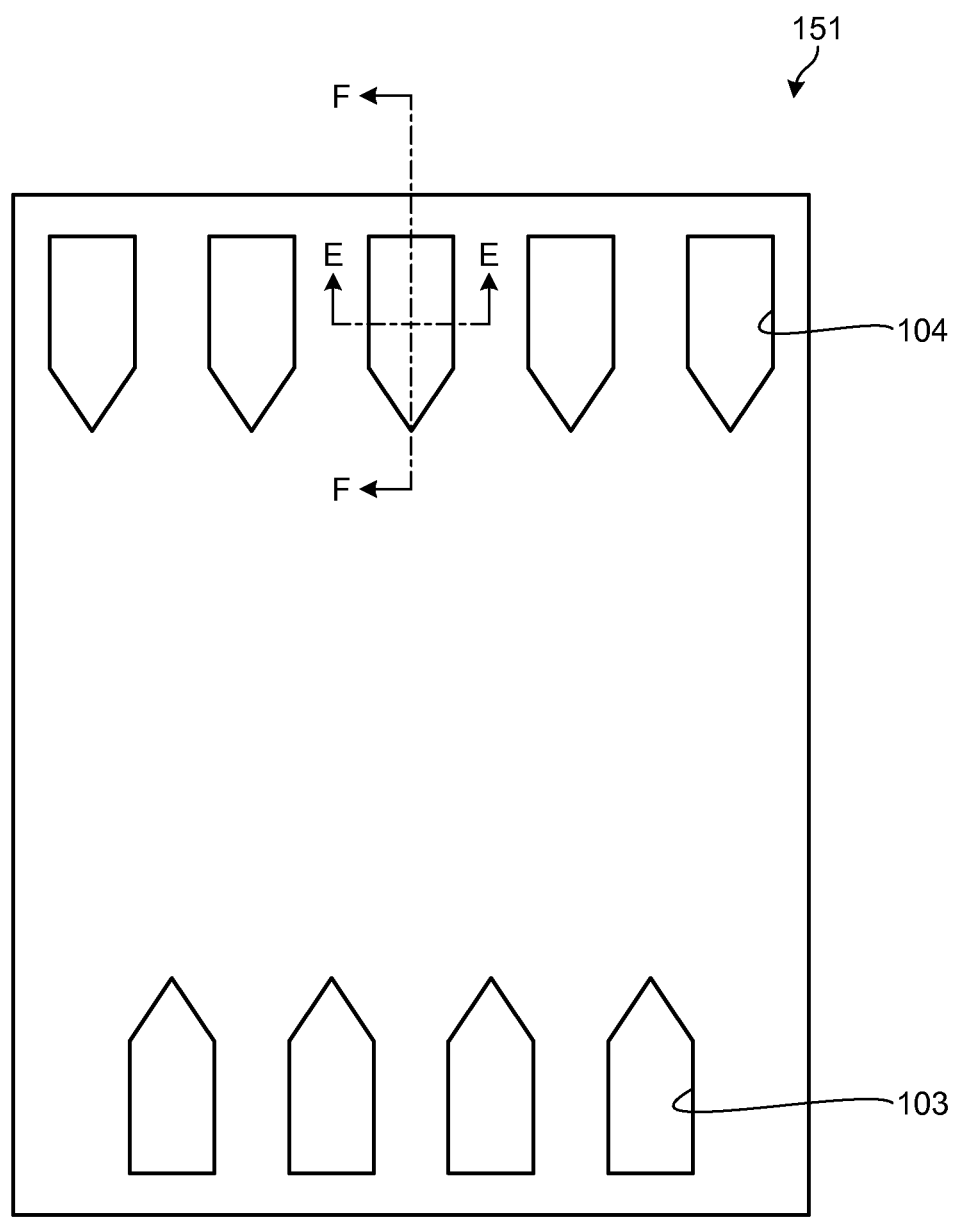
FIG. 16 is a plan view of an outer plate.
Figure 17:
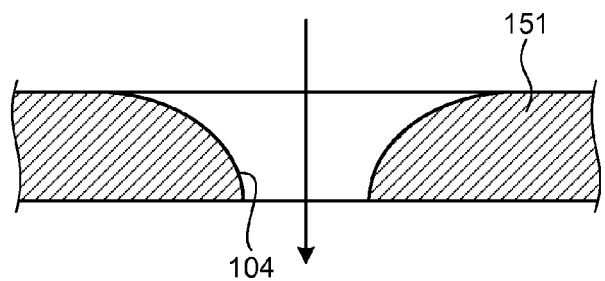
FIG. 17 is a cross-sectional view taken along line E-E illustrated in FIG. 16.
Figure 18:
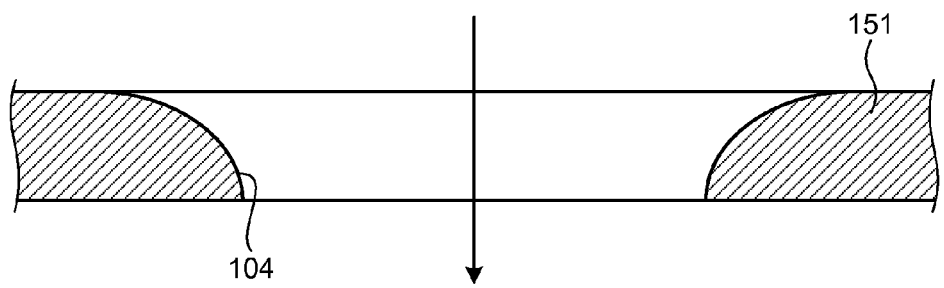
FIG. 18 is a cross-sectional view taken along line F-F illustrated in FIG. 16.

FIG. 16 is a plan view of the outer plate 151. FIG. 17 is a cross-sectional view taken along line E-E illustrated in FIG. 16. FIG. 18 is a cross-sectional view taken along line F-F illustrated in FIG. 16. Openings that will be the inlets of the third flow paths 103 and the inlets of the fourth flow paths 104 are formed in the outer plate 151.

As illustrated in FIGS. 17 and 18, the inlets each have a shape in which the flow path area gradually decreases toward the inside. The inner surface of each inlet is curved. Therefore, fluid can smoothly flow into the third flow paths 103 and the fourth flow paths 104 and thus it is possible to suppress an increase of the pressure loss that is caused by the compression of the fluid.

The outer plate 151 is provided on both sides of the laminated total heat exchange element 200; therefore, the inlets to the third flow paths 103 and the fourth flow paths 104 are formed in both sides of the laminated total heat exchange element 200. In other words, the third flow paths 103 and the fourth flow paths 104 penetrate the laminated total heat exchange element 200. The inlets to the third flow paths 103 and the fourth flow paths 104 may be formed in one side or both sides of the laminated total heat exchange element 200.

The outer plates 151 may be formed of metal or may be formed of polystyrene foam or the like. The shape of the inlets as illustrated in FIGS. 17 and 18 may be applied to the rectangular third flow paths 3 and fourth flow paths 4 explained in the first embodiment. In other words, it is possible to apply the shape as illustrated in FIGS. 17 and 18 with which fluid smoothly flows into the flow paths irrespective of the shape of the flow paths.

Figure 19:
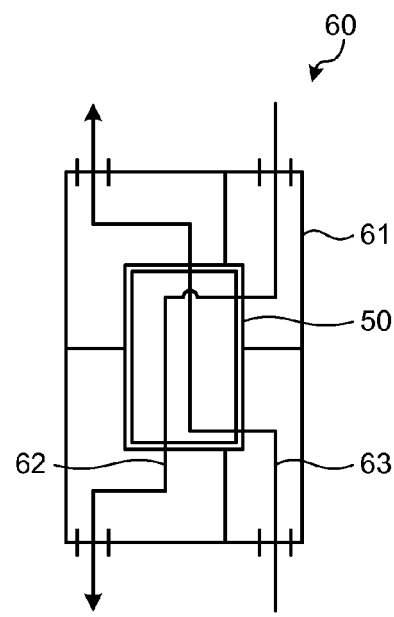
FIG. 19 is a diagram illustrating the schematic configuration of a heat exchange ventilator that includes the laminated total heat exchange element.

FIG. 19 is a diagram illustrating the schematic configuration of a heat exchange ventilator 60 that includes the laminated total heat exchange element 50. In the heat exchange ventilator 60, the laminated total heat exchange element 50 is housed in a casing 61. In the casing 61, air supply paths 62 for supplying outdoor air to the inside and air exhaust paths 63 for exhausting indoor air to the outside are formed.

Part of the air supply path 62 is configured from the third flow path 3, the first flow path 1, and the fifth flow path 5 (see also FIG. 1 and the like) of the laminated total heat exchange element 50 housed in the casing 61. Part of the air exhaust path 63 is configured from the fourth flow path 4, the second flow path 2, and the sixth flow path 6 (see also FIG. 1 and the like) of the laminated total heat exchange element 50 housed in the casing 61. Although not illustrated, an air blower may be provided in the air supply path 62 and the air exhaust path 63.

According to the heat exchange ventilator 60 configured as above, ventilation can be performed while performing total heat exchange between indoor air and outdoor air by using the counterflow system. Accordingly, it is possible to improve the heat exchange efficiency and thus reduce the air-conditioning load and the like.

Figure 20:
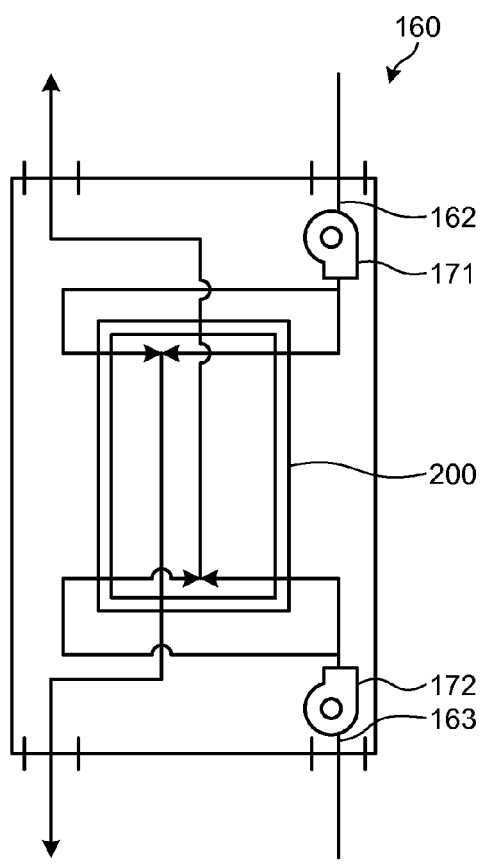
FIG. 20 is a diagram illustrating the schematic configuration of a heat exchange ventilator that includes the laminated total heat exchange element.

FIG. 20 is a diagram illustrating the schematic configuration of a heat exchange ventilator 160 that includes the laminated total heat exchange element 200. In the heat exchange ventilator 160, an air supply path 162 is in communication with both sides of the third flow path 103 formed to penetrate the laminated total heat exchange element 200 (see also FIG. 15). Moreover, an air exhaust path 163 is in communication with both sides of the fourth flow path 104 formed to penetrate the laminated total heat exchange element 200 (see also FIG. 15).

Fluid flows into the third flow paths 103 and the fourth flow paths 104 from both sides of the laminated total heat exchange element 200. The area of the inlets to the third flow paths 103 and the area of the inlets to the fourth flow paths 104 can be increased compared with the case where fluid flows in from one side of the laminated total heat exchange element 200. Accordingly, the wind speed in the third flow paths 103 and the fourth flow paths 104 can be reduced and thus it is possible to reduce the pressure loss that is caused by the compression of the fluid.

In the heat exchange ventilator 160, an air supply blower 171 and an air exhaust blower 172 are provided on the upstream side of the laminated total heat exchange element 200 to force fluid into the third flow paths 103 and the fourth flow paths 104. The pressure loss can be further reduced by forcing fluid into the third flow paths 103 and the fourth flow paths 104 when compared with the case where the air supply blower 171 and the air exhaust blower 172 are provided on the downstream side of the laminated total heat exchange element 200 and fluid is drawn from the fifth flow paths 105 and the sixth flow paths 106. This is because when fluid is drawn from the flow paths, the wind flowing out from between the laminated plates 11 and the wind flowing along the fifth flow paths 105 and the sixth flow paths 106 interfere with each other and thus the pressure loss increases.

In the laminated total heat exchange element 50 (see also FIG. 1) explained in the first embodiment, the third flow paths 3 and the fourth flow paths 4 may be formed to penetrate the laminated total heat exchange element 50 and the air supply paths and the air exhaust paths may respectively be in communication with both sides thereof.

INDUSTRIAL APPLICABILITY

As described above, the laminated total heat exchange element according to the present invention is useful for exchanging heat between fluids.

REFERENCE SIGNS LIST 1 first flow path, 1a inlet, 1b outlet, 2 second flow path, 2a inlet, 2b outlet, 3 third flow path, 4 fourth flow path, 5 fifth flow path, 6 sixth flow path, 11 laminated plate, 20 spacing member, 21 first spacing member, second spacing member, 24, 25 wall surface portion, 26 partition wall, 27 independent wall, 30 flow path, 31, 32, region, 50 laminated total heat exchange element, 60 heat exchange ventilator, 61 casing, 62 air supply path, 63 air exhaust path, 101 first flow path, 102 second flow path, 103c tapered portion, 103b incremental portion, 103a rectangular portion, 103 third flow path, 104c tapered portion, 104b incremental portion, 104a rectangular portion, 104 fourth flow path, 105b tapered portion, 105c incremental portion, 105a rectangular portion, 105 fifth flow path, 106b tapered portion, 106c incremental portion, 106a rectangular portion, 106 sixth flow path, 121 first spacing member, 122 second spacing member, 150 element unit, 151 outer plate, 160 heat exchange ventilator, 162 air supply path, 163 air exhaust path, 171 air supply blower, 172 air exhaust blower, 200 laminated total heat exchange element, X, Y, Z arrow.

The invention claimed is:

1. A laminated total heat exchange element comprising:
a plurality of laminated plates that are laminated;
a first spacing member that is inserted between the laminated plates and forms a first flow path between the laminated plates; and
a second spacing member that is inserted between the laminated plates and forms a second flow path between the laminated plates, and in which a layer in which the first flow path is formed and a layer in which the second flow path is formed are alternately provided, wherein
the first flow path is formed to allow fluid to pass from one side to another side of the laminated total heat exchange element,
the second flow path is formed to allow fluid to pass from the another side to the one side of the laminated total heat exchange element,
a third flow path is formed, the third flow path communicating with the first flow path on the one side and extending substantially parallel to a lamination direction of the laminated plates,
a fourth flow path is formed, the fourth flow path communicating with the second flow path on the another side and extending substantially parallel to the lamination direction of the laminated plate,
a fifth flow path is formed, the fifth flow path communicating with the first flow path on the another side and extending substantially parallel to a direction in which fluid passes in the first flow path,
a sixth flow path is formed, the sixth flow path communicating with the second flow path on the one side and extending substantially parallel to a direction in which fluid passes in the second flow path,
a plurality of the third flow paths and a plurality of the sixth flow paths are formed on the one side of the laminated total heat exchange element such that the third flow path and the sixth flow path are alternately formed, in a layer in which the first flow path is formed, the third flow path includes a rectangular portion having a rectangular shape when viewed from the lamination direction and an incremental portion in which a width of a flow path gradually increases toward the first flow path, and in a layer in which the second flow path is formed, the third flow path includes the rectangular portion and a tapered portion in which a width of a flow path gradually decreases toward the second flow path.

2. A laminated total heat exchange element comprising:

a plurality of laminated plates that are laminated;

a first spacing member that is inserted between the laminated plates and forms a first flow path between the laminated plates; and a second spacing member that is inserted between the laminated plates and forms a second flow path between the laminated plates, and in which a layer in which the first flow path is formed and a layer in which the second flow path is formed are alternately provided, wherein the first flow path is formed to allow fluid to pass from one side to another side of the laminated total heat exchange element, the second flow path is formed to allow fluid to pass from the another side to the one side of the laminated total heat exchange element, a third flow path is formed, the third flow path communicating with the first flow path on the one side and extending substantially parallel to a lamination direction of the laminated plates, a fourth flow path is formed, the fourth flow path communicating with the second flow path on the another side and extending substantially parallel to the lamination direction of the laminated plate, a fifth flow path is formed, the fifth flow path communicating with the first flow path on the another side and extending substantially parallel to a direction in which fluid passes in the first flow path, a sixth flow path is formed, the sixth flow path communicating with the second flow path on the one side and extending substantially parallel to a direction in which fluid passes in the second flow path, a plurality of the fourth flow paths and a plurality of the fifth flow paths are formed on the another side of the laminated total heat exchange element such that the fourth flow path and the fifth flow path are alternately formed, in a layer in which the second flow path is formed, the fourth flow path includes a rectangular portion having a rectangular shape when viewed from the lamination direction and an incremental portion in which a width of a flow path gradually increases toward the second flow path, and in a layer in which the first flow path is formed, the fourth flow path includes the rectangular portion and a tapered portion in which a width of a flow path gradually decreases toward the first flow path.

3. The laminated total heat exchange element according to claim 2, wherein, in the laminated plate, a region overlapping the tapered portion when viewed from the lamination direction is cut out.

* * * * *